US012512106B2

(12) United States Patent
Beer et al.

(10) Patent No.: US 12,512,106 B2
(45) Date of Patent: Dec. 30, 2025

(54) METHODS AND APPARATUS FOR UNIFIED SPEECH AND AUDIO DECODING IMPROVEMENTS

(71) Applicant: Dolby International AB, Dublin (IE)

(72) Inventors: Michael Franz Beer, Nuremberg (DE); Eytan Rubin, Nurnberg (DE); Daniel Fischer, Fuerth (DE); Christof Fersch, Neumarkt (DE); Markus Werner, Karlsruhe (DE)

(73) Assignee: Dolby International AB, Dublin (IE)

( * ) Notice: Subject to any disclaimer, the term of this patent is extended or adjusted under 35 U.S.C. 154(b) by 412 days.

(21) Appl. No.: 17/925,507

(22) PCT Filed: May 18, 2021

(86) PCT No.: PCT/EP2021/063092
§ 371 (c)(1),
(2) Date: Nov. 15, 2022

(87) PCT Pub. No.: WO2021/233886
PCT Pub. Date: Nov. 25, 2021

(65) Prior Publication Data

US 2023/0186928 A1 Jun. 15, 2023

Related U.S. Application Data

(60) Provisional application No. 63/027,594, filed on May 20, 2020.

(30) Foreign Application Priority Data

May 20, 2020 (EP) .................................... 20175652

(51) Int. Cl.
*G10L 19/18* (2013.01)
*G10L 19/02* (2013.01)
(Continued)

(52) U.S. Cl.
CPC .............. *G10L 19/18* (2013.01); *G10L 19/02* (2013.01); *G10L 19/07* (2013.01); *G10L 19/167* (2013.01)

(58) Field of Classification Search
CPC ......... G10L 19/18; G10L 19/02; G10L 19/07; G10L 19/167; G10L 19/04; G10L 19/022; G10L 19/13; G10L 19/008
See application file for complete search history.

(56) References Cited

U.S. PATENT DOCUMENTS 7,003,454 B2 2/2006 Anssi
7,848,925 B2 12/2010 Ehara
(Continued)

FOREIGN PATENT DOCUMENTS

CN 103384900 B 6/2015
CN 102460570 3/2016
(Continued)

OTHER PUBLICATIONS

Yuqun Xue, Zhijiu Zhu, Jianhua Jiang, Yi Zhan, Zenghui Yu, Xiaohua Fan, Shushan Qiao, "Fast computation of LSP frequencies using the Bairstow method", Electronics 2020, 9, 387, Feb. 26, 2020 (Year: 2020).*
(Continued)

*Primary Examiner* — Paras D Shah
*Assistant Examiner* — Nadira Sultana

(57) ABSTRACT

Described herein are methods, apparatus and computer products for decoding an encoded MPEG-D USAC bitstream. Described herein are such methods, apparatus and computer products that reduce a computational complexity.

13 Claims, 10 Drawing Sheets

(51) Int. Cl.
*G10L 19/07* (2013.01)
*G10L 19/16* (2013.01)

(56) References Cited

U.S. PATENT DOCUMENTS

| | | | | |
|---|---|---|---|---|
| 8,484,038 | B2 * | 7/2013 | Bessette | G10L 19/18 704/219 |
| 8,744,863 | B2 * | 6/2014 | Neuendorf | G10L 19/022 704/219 |
| 8,959,015 | B2 | 2/2015 | Lee | |
| 9,257,130 | B2 * | 2/2016 | Lecomte | G10L 19/0212 |
| 9,311,926 | B2 | 4/2016 | Sung | |
| 9,384,748 | B2 * | 7/2016 | Beack | G10L 19/18 |
| 9,552,822 | B2 * | 1/2017 | Multrus | G10L 21/00 |
| 9,734,836 | B2 | 8/2017 | Liu | |
| 9,922,656 | B2 | 3/2018 | Peters | |
| 9,928,845 | B2 * | 3/2018 | Fischer | G10L 19/22 |
| 10,269,357 | B2 | 4/2019 | Zhang | |
| 10,388,287 | B2 * | 8/2019 | Disch | G10L 19/13 |
| 10,511,865 | B2 | 12/2019 | Thoma | |
| 10,614,824 | B2 * | 4/2020 | Fischer | G10L 19/167 |
| 11,217,260 | B2 * | 1/2022 | Neuendorf | G10L 19/167 |
| 2012/0209600 | A1 * | 8/2012 | Kim | G10L 19/025 704/E19.048 |
| 2014/0297291 | A1 | 10/2014 | Baumgarte | |
| 2019/0025845 | A1 | 1/2019 | Wu | |
| 2019/0371351 | A1 | 12/2019 | Neuendorf | |
| 2020/0380997 | A1 | 12/2020 | Kumar | |
| 2021/0005212 | A1 | 1/2021 | Kumar | |
| 2021/0020186 | A1 | 1/2021 | Kumar | |

FOREIGN PATENT DOCUMENTS

| | | | | |
|---|---|---|---|---|
| CN | 107430863 | B | 1/2021 | |
| CN | 110476207 | B | 9/2023 | |
| EP | 3483882 | A1 | 5/2019 | |
| EP | 3352168 | B1 | 9/2020 | |
| JP | 2016539357 | | 12/2016 | |
| JP | 2020507131 | | 3/2020 | |
| RU | 2571388 | C2 | 12/2015 | |
| RU | 2648588 | C2 | 3/2018 | |
| WO | 2011048094 | A1 | 4/2011 | |
| WO | 2011085483 | A1 | 7/2011 | |
| WO | 2012004349 | A1 | 1/2012 | |
| WO | 2018130577 | A1 | 7/2018 | |
| WO | 2019121980 | A1 | 6/2019 | |
| WO | WO-2019121982 | A1 * | 6/2019 | G10L 19/008 |

OTHER PUBLICATIONS

Reina Hongyo, Thi Hong Tran, Leonardo Lanante Jr and Hiroshi Ochi, "A Design of Low Complex Log Likelihood Ratio for MIMO Decoder Using the Bit Shift", IEEE 2014 (Year: 2014).*

Shi-Huang Chen and Jiun-Ching Ruan, "An Efficient Computation of LSP Frequencies Using Modified Complex-Free Ferrari Formula", Journal of Signal Processing Systems 52, pp. 153-163, 2008 (Year: 2008).*

EVS Codec 3GPP TS26, Jun. 30, 2015.

ISO/IEC 23003-3, Information Technology—MPEG Audio Technologies—Part 3: Unified Speech and Audio Coding, 2012.

Neuendorf, M. et al."Completion of Core Experiment on Unification of USAC Windowing and Frame Transitions" MPEG Meeting, Jan. 13, 2010.

Sugiura, R. et al."Direct Linear Conversion of LSP Parameters for Perceptual Control in Speech and Audio Coding" IEEE 22nd European Signal 2014.

"Research on Unified of Audio and Speech Coding Based on Compressed Sensing," Abstract in English (p. 4-5), https://www.cnki.net, pp. 1-85.

* cited by examiner

METHODS AND APPARATUS FOR UNIFIED SPEECH AND AUDIO DECODING IMPROVEMENTS

CROSS-REFERENCE TO RELATED APPLICATIONS

This application claims priority of the following priority applications: US provisional application 63/027,594 (reference: D20046USP1), filed 20 May 2020 and EP application 20175652.5 (reference: D20046EP), filed 20 May 2020, which are hereby incorporated by reference.

TECHNOLOGY

The present disclosure relates generally to methods and apparatus for decoding an encoded MPEG-D USAC bitstream. The present disclosure further relates to such methods and apparatus that reduce a computational complexity. The present disclosure moreover also relates to respective computer program products.

While some embodiments will be described herein with particular reference to that disclosure, it will be appreciated that the present disclosure is not limited to such a field of use and is applicable in broader contexts.

BACKGROUND

Any discussion of the background art throughout the disclosure should in no way be considered as an admission that such art is widely known or forms part of common general knowledge in the field.

Decoders for unified speech and audio coding (USAC), as specified in the international standard ISO/IEC 23003-3 (henceforth referred to as MPEG-D USAC standard) include several modules (units) that require multiple complex computation steps. Each of these computation steps may be taxing for hardware systems implementing these decoders. Examples of such modules include the forward-aliasing cancellation, FAC, module (or tool), and the Linear Prediction Coding, LPC, module.

In the context of adaptive streaming, when switching to a different configuration (e.g., a different bitrate such as a bitrate configured within an adaption set in MPEG-DASH), in order to reproduce the signal accurately from the beginning, a decoder needs to be supplied with a frame ($AU_n$) representing the corresponding time-segment of a program, and with additional pre-roll frames ($AU_{n-1}$, $AU_{n-2}$, . . . $AU_s$) and configuration data preceding the frame $AU_n$. Otherwise, due to different coding configurations (e.g., Windowing data, SBR-related data, data related to stereo coding (MPS212)), it cannot be guaranteed that a decoder produces correct output when decoding only the frame $AU_n$.

Therefore, the first frame $AU_n$ to be decoded with a new (current) configuration may carry the new configuration data and all pre-roll frames (in form of $AU_{n-x}$, representing time-segments before $AU_n$) that are needed to initialize the decoder with the new configuration. This can, for example, be done by means of an Immediate Playout Frame (IPF).

In view of the above, there is thus an existing need for an implementation of processes and modules of MPEG-D USAC decoders that reduce computational complexity.

SUMMARY

In accordance with a first aspect of the present disclosure there is provided a decoder for decoding an encoded MPEG-D USAC bitstream. The decoder may comprise a receiver configured to receive the encoded bitstream, wherein the bitstream represents a sequence of sample values (in the following termed audio sample values) and comprises a plurality of frames, wherein each frame comprises associated encoded audio sample values, wherein the bitstream comprises a pre-roll element including one or more pre-roll frames needed by the decoder to build up a full signal so as to be in a position to output valid audio sample values associated with a current frame, and wherein the bitstream further comprises a USAC configuration element comprising a current USAC configuration as payload and a current bitstream identification. The decoder may further comprise a parser configured to parse the USAC configuration element up to the current bitstream identification and to store a start position of the USAC configuration element and a start position of the current bitstream identification in the bitstream. The decoder may further comprise a determiner configured to determine whether the current USAC configuration differs from a previous USAC configuration, and, if the current USAC configuration differs from the previous USAC configuration, store the current USAC configuration. And the decoder may comprise an initializer configured to initialize the decoder if the determiner determines that the current USAC configuration differs from the previous USAC configuration, wherein initializing the decoder may comprise decoding the one or more pre-roll frames included in the pre-roll element. Initializing the decoder may further comprise switching the decoder from the previous USAC configuration to the current USAC configuration, thereby configuring the decoder to use the current USAC configuration if the determiner determines that the current USAC configuration differs from the previous USAC configuration. And the decoder may be configured to discard and not decode the pre-roll element if the determiner determines that the current USAC configuration is identical with the previous USAC configuration.

In case of adaptive streaming, processing of MPEG-D USAC bitstreams may involve switching from a previous to a current, different configuration. This may, for example, be done by means of an Immediate Playout Frame (IPF). In this case, a pre-roll element may still be fully decoded (i.e. including pre-roll frames) every time, irrespective of a configuration change. Configured as above, the decoder enables to avoid such unnecessary decoding of pre-roll elements.

In some embodiments, the determiner may be configured to determine whether the current USAC configuration differs from the previous USAC configuration by checking the current bitstream identification against a previous bitstream identification.

In some embodiments, the determiner may be configured to determine whether the current USAC configuration differs from the previous USAC configuration by checking a length of the current USAC configuration against the length of the previous USAC configuration.

In some embodiments, if it is determined that the current bitstream identification is identical with the previous bitstream identification and/or if it is determined that the length of the current USAC configuration is identical with the length of the previous USAC configuration, the determiner may be configured to determine whether the current USAC configuration differs from the previous USAC configuration by comparing bytewise the current USAC configuration with the previous USAC configuration.

In some embodiments, the decoder may further be configured to delay the output of valid audio sample values associated with the current frame by one frame, wherein delaying the output of valid audio sample values by one frame may include buffering each frame of audio samples before outputting and wherein the decoder may further be configured, if it is determined that the current USAC configuration differs from the previous USAC configuration, to perform crossfading of a frame of the previous USAC configuration buffered in the decoder with the current frame of the current USAC configuration.

In accordance with a second aspect of the present disclosure there is provided a method of decoding, by a decoder, an encoded MPEG-D USAC bitstream. The method may comprise receiving the encoded bitstream, wherein the bitstream represents a sequence of audio sample values and comprises a plurality of frames, wherein each frame comprises associated encoded audio sample values, wherein the bitstream comprises a pre-roll element including one or more pre-roll frames needed by the decoder to build up a full signal so as to be in a position to output valid audio sample values associated with a current frame, and wherein the bitstream further comprises a USAC configuration element comprising a current USAC configuration as payload and a current bitstream identification. The method may further comprise parsing the USAC configuration element up to the current bitstream identification and storing a start position of the USAC configuration element and a start position of the current bitstream identification in the bitstream. The method may further comprise determining whether the current USAC configuration differs from a previous USAC configuration, and, if the current USAC configuration differs from the previous USAC configuration, storing the current USAC configuration. And the method may comprise initializing the decoder if it is determined that the current USAC configuration differs from the previous USAC configuration, wherein initializing the decoder may comprise decoding the one or more pre-roll frames included in the pre-roll element, and switching the decoder from the previous USAC configuration to the current USAC configuration thereby configuring the decoder to use the current USAC configuration if it is determined that the current USAC configuration differs from the previous USAC configuration. The method may further comprise discarding and not decoding, by the decoder, the pre-roll element if it is determined that the current USAC configuration is identical with the previous USAC configuration.

In some embodiments, determining whether the current USAC configuration differs from the previous USAC configuration may include checking the current bitstream identification against a previous bitstream identification.

In some embodiments, determining whether the current USAC configuration differs from the previous USAC configuration may include checking a length of the current USAC configuration against the length of the previous USAC configuration.

In some embodiments, if it is determined that the current bitstream identification is identical with the previous bitstream identification and/or if it is determined that the length of the current USAC configuration is identical with the length of the previous USAC configuration, determining whether the current USAC configuration differs from the previous USAC configuration may include comparing bytewise the current USAC configuration with the previous USAC configuration.

In some embodiments, the method may further comprise delaying the output of valid audio sample values associated with the current frame by one frame, wherein delaying the output of valid audio sample values by one frame may include buffering each frame of audio samples before outputting and, if it is determined that the current USAC configuration differs from the previous USAC configuration, performing crossfading of a frame of the previous USAC configuration buffered in the decoder with the current frame of the current USAC configuration.

In accordance with a third aspect of the present disclosure there is provided a decoder for decoding an encoded MPEG-D USAC bitstream, the encoded bitstream including a plurality of frames, each composed of one or more subframes, wherein the encoded bitstream includes, as a representation of linear prediction coefficients, LPCs, one or more line spectral frequency, LSF, sets for each subframe. The decoder may be configured to decode the encoded bitstream, wherein decoding the encoded bitstream by the decoder may comprise decoding the LSF sets for each subframe from the bitstream. And decoding the encoded bitstream by the decoder may comprise converting the decoded LSF sets to linear spectral pair, LSP, representations for further processing. The decoder may further be configured to temporarily store, for each frame, the decoded LSF sets for interpolation with a subsequent frame.

Configured as above, the decoder enables to directly use the last set saved in LSF representation thus avoiding the need to convert the last set saved in LSP representation to LSF.

In some embodiments, the further processing may include determining the LPCs based on the LSP representations by applying a root finding algorithm, wherein applying the root finding algorithm may involve scaling of coefficients of the LSP representations within the root finding algorithm to avoid overflow in a fixed point range.

In some embodiments, applying the root find algorithm may involve finding polynomial F1(z) and/or F2(z) from the LSP representations by expanding respective product polynomials, wherein scaling is performed as a power of 2 scaling of the polynomial coefficients. This scaling may involve or correspond to a left bit-shift operation.

In some embodiments, the decoder may be configured to retrieve quantized LPC filters and to compute their weighted versions and to compute corresponding decimated spectrums, wherein a modulation may be applied to the LPCs prior to computing the decimated spectrums based on pre-computed values that may be retrieved from one or more look-up tables.

In accordance with a fourth aspect of the present disclosure there is provided a method of decoding an encoded MPEG-D USAC bitstream, the encoded bitstream including a plurality of frames, each composed of one or more subframes, wherein the encoded bitstream includes, as a representation of linear prediction coefficients, LPCs, one or more line spectral frequency, LSF, sets for each subframe. The method may include decoding the encoded bitstream, wherein decoding the encoded bitstream may comprise decoding the LSF sets for each subframe from the bitstream. And decoding the encoded bitstream may comprise converting the decoded LSF sets to linear spectral pair, LSP, representations for further processing. The method may further include temporarily storing, for each frame, the decoded LSF sets for interpolation with a subsequent frame.

In some embodiments, the further processing may include determining the LPCs based on the LSP representations by applying a root finding algorithm, wherein applying the root finding algorithm may involve scaling of coefficients of the LSP representations within the root finding algorithm to avoid overflow in a fixed point range.

In some embodiments, applying the root find algorithm may involve finding polynomial F1(z) and/or F2(z) from the LSP representations by expanding respective product polynomials, wherein scaling is performed as a power of 2 scaling of the polynomial coefficients. This scaling may involve or correspond to a left bit-shift operation.

In accordance with a fifth aspect of the present disclosure there is provided a decoder for decoding an encoded MPEG-D USAC bitstream. The decoder may be configured to implement a forward-aliasing cancellation, FAC, tool, for canceling time-domain aliasing and/or windowing when transitioning between Algebraic Code Excited Linear Prediction, ACELP, coded frames and transform coded, TC, frames within a linear prediction domain, LPD, codec. The decoder may further be configured to perform a transition from the LPD to the frequency domain, FD, and apply the FAC tool if a previous decoded windowed signal was coded with ACELP. The decoder may further be configured to perform a transition from the FD to the LPD, and apply the FAC tool if a first decoded window was coded with ACELP, wherein the same FAC tool may be used in both transitions from the LPD to the FD, and from the FD to the LPD.

Configured as above, the decoder enables the use of a forward-aliasing cancellation (FAC) tool in both codecs, LPD and FD.

In some embodiments, an ACELP zero input response may be added, when the FAC tool is used for the transition from FD to LPD.

In accordance with a sixth aspect of the present disclosure there is provided a method of decoding an encoded MPEG-D USAC bitstream by a decoder implementing a forward-aliasing cancellation, FAC, tool, for canceling time-domain aliasing and/or windowing when transitioning between Algebraic Code Excited Linear Prediction, ACELP, coded frames and transform coded, TC, frames within a linear prediction domain, LPD, codec. The method may include performing a transition from the LPD to the frequency domain, FD, and applying the FAC tool if a previous decoded windowed signal was coded with ACELP. The method may further include performing a transition from the FD to the LPD, and applying the FAC tool if a first decoded window was coded with ACELP, wherein the same FAC tool may be used in both transitions from the LPD to the FD, and from the FD to the LPD.

In some embodiments, the method may further include adding an ACELP zero input response, when the FAC tool is used for the transition from FD to LPD.

In accordance with a seventh aspect of the present disclosure there is provided a computer program product with instructions adapted to cause a device having processing capability to carry out a method of decoding, by a decoder, an encoded MPEG-D USAC bitstream, a method of decoding an encoded MPEG-D USAC bitstream, the encoded bitstream including a plurality of frames, each composed of one or more subframes, wherein the encoded bitstream includes, as a representation of linear prediction coefficients, LPCs, one or more line spectral frequency, LSF, sets for each subframe or a method of decoding an encoded MPEG-D USAC bitstream by a decoder implementing a forward-aliasing cancellation, FAC, tool, for canceling time-domain aliasing and/or windowing when transitioning between Algebraic Code Excited Linear Prediction, ACELP, coded frames and transform coded, TC, frames within a linear prediction domain, LPD, codec.

BRIEF DESCRIPTION OF THE DRAWINGS

Example embodiments of the disclosure will now be described, by way of example only, with reference to the accompanying drawings in which.

DESCRIPTION OF EXAMPLE EMBODIMENTS

Processing of MPEG-D USAC Bitstreams

Processing of MPEG-D USAC bitstreams, as described herein, relates to the different steps of decoding an encoded MPEG-D USAC bitstream as applied by a respective decoder. Here and in the following, MPEG-D USAC bitstreams may refer to bitstreams compatible with the standard set out in ISO/IEC 23003-3:2012, Information technology-MPEG audio technologies—Part 3: unified speech and audio coding, and subsequent versions, amendments and corrigenda ("hereinafter MPEG-D USAC or USAC").

Figure 1:
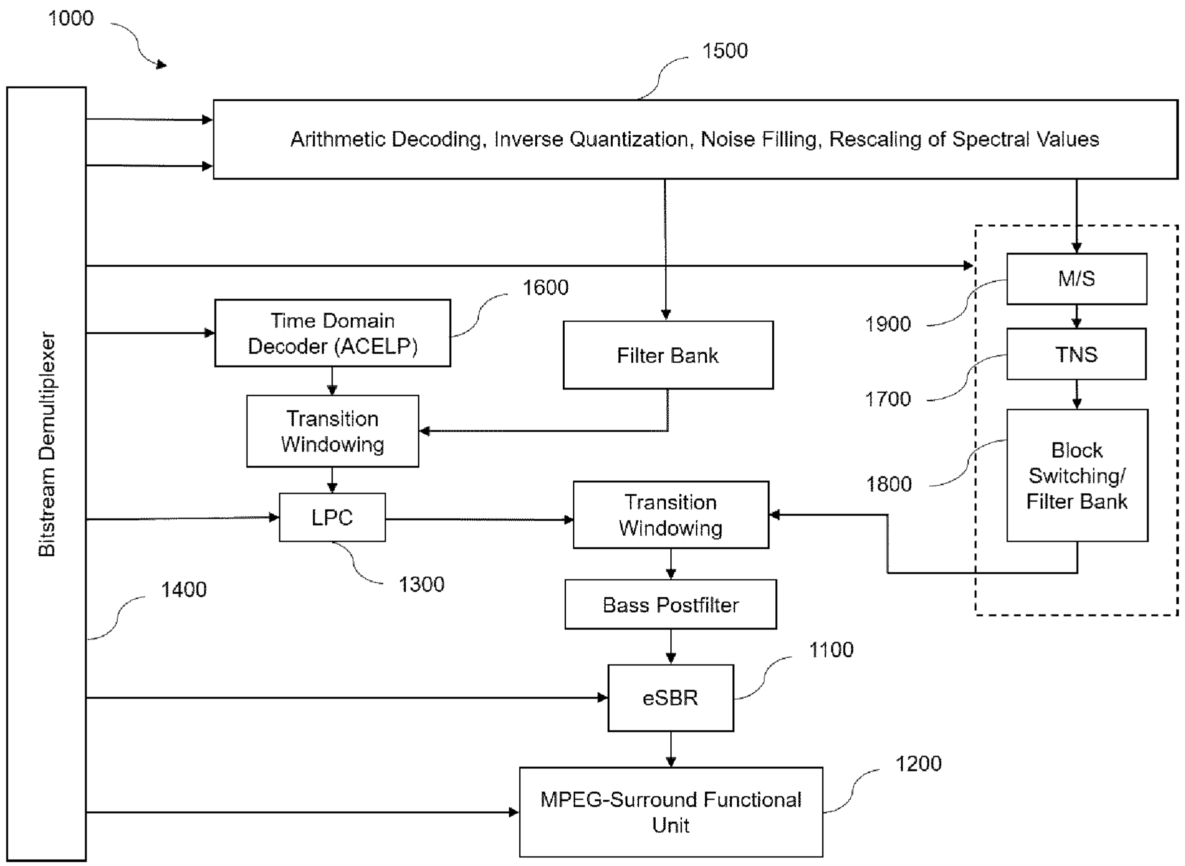
FIG. 1 schematically illustrates an example of an MPEG-D USAC decoder.

Referring to the example of FIG. 1, an MPEG-D USAC decoder 1000 is illustrated. The decoder 1000 includes an MPEG Surround functional unit 1200 to handle stereo or multi-channel processing. The MPEG Surround functional unit 1200 may be described in clause 7.11 of the USAC standard, for example This clause is hereby incorporated by reference in its entirety. The MPEG Surround functional unit 1200 may include a one-to-two (OTT) box (OTT decoding block), as an example of an upmixing unit, which can perform mono to stereo upmixing. The decoder 1000 further includes a bitstream payload demultiplexer tool 1400, which separates the bitstream payload into the parts for each tool, and provides each of the tools with the bitstream payload information related to that tool; a scalefactor noiseless decoding tool 1500, which takes information from the bitstream payload demultiplexer, parses that information, and decodes the Huffman and differential pulse-code modulation (DPCM) coded scalefactors; a spectral noiseless decoding tool 1500, which takes information from the bitstream payload demultiplexer, parses that information, decodes the arithmetically coded data, and reconstructs the quantized spectra; an inverse quantizer tool 1500, which takes the quantized values for the spectra, and converts the integer values to the non-scaled, reconstructed spectra; this quantizer is preferably a companding quantizer, whose companding factor depends on the chosen core coding mode; a noise filling tool 1500, which is used to fill spectral gaps in the decoded spectra, which occur when spectral values are quantized to zero e.g. due to a strong restriction on bit demand in the encoder; a rescaling tool 1500, which converts the integer representation of the scalefactors to the actual values, and multiplies the un-scaled inversely quantized spectra by the relevant scalefactors; a M/S tool 1900, as described in ISO/IEC 14496-3; a temporal noise shaping (TNS) tool 1700, as described in ISO/IEC 14496-3; a filter bank/block switching tool 1800, which applies the inverse of the frequency mapping that was carried out in the encoder; an inverse modified discrete cosine transform (IMDCT) is preferably used for the filter bank tool; a time-warped filter bank/block switching tool 1800, which replaces the normal filter bank/block switching tool when the time warping mode is enabled; the filter bank preferably is the same (IMDCT) as for the normal filter bank, additionally the windowed time domain samples are mapped from the warped time domain to the linear time domain by time-varying resampling; a Signal Classifier tool, which analyses the original input signal and generates from it control information which triggers the selection of the different coding modes; the analysis of the input signal is typically implementation dependent and will try to choose the optimal core coding mode for a given input signal frame; the output of the signal classifier may optionally also be used to influence the behavior of other tools, for example MPEG Surround, enhanced spectral band replication (SBR), time-warped filterbank and others; and an algebraic code-excited linear prediction (ACELP) tool 1600, which provides a way to efficiently represent a time domain excitation signal by combining a long term predictor (adaptive codeword) with a pulse-like sequence (innovation codeword). The decoder 1000 may further include a LPC filter tool 1300, which produces a time domain signal from an excitation domain signal by filtering the reconstructed excitation signal through a linear prediction synthesis filter. The decoder 1000 may also include an enhanced Spectral Bandwidth Replication (eSBR) unit 1100. The eSBR unit 1100 may be described in clause 7.5 of the USAC standard, for example This clause is hereby incorporated by reference in its entirety. The eSBR unit 1100 receives the encoded audio bitstream or the encoded signal from an encoder. The eSBR unit 1100 may generate a high frequency component of the signal, which is merged with the decoded low frequency component to yield a decoded signal. In other words, the eSBR unit 1100 may regenerate the highband of the audio signal.

Figure 2:
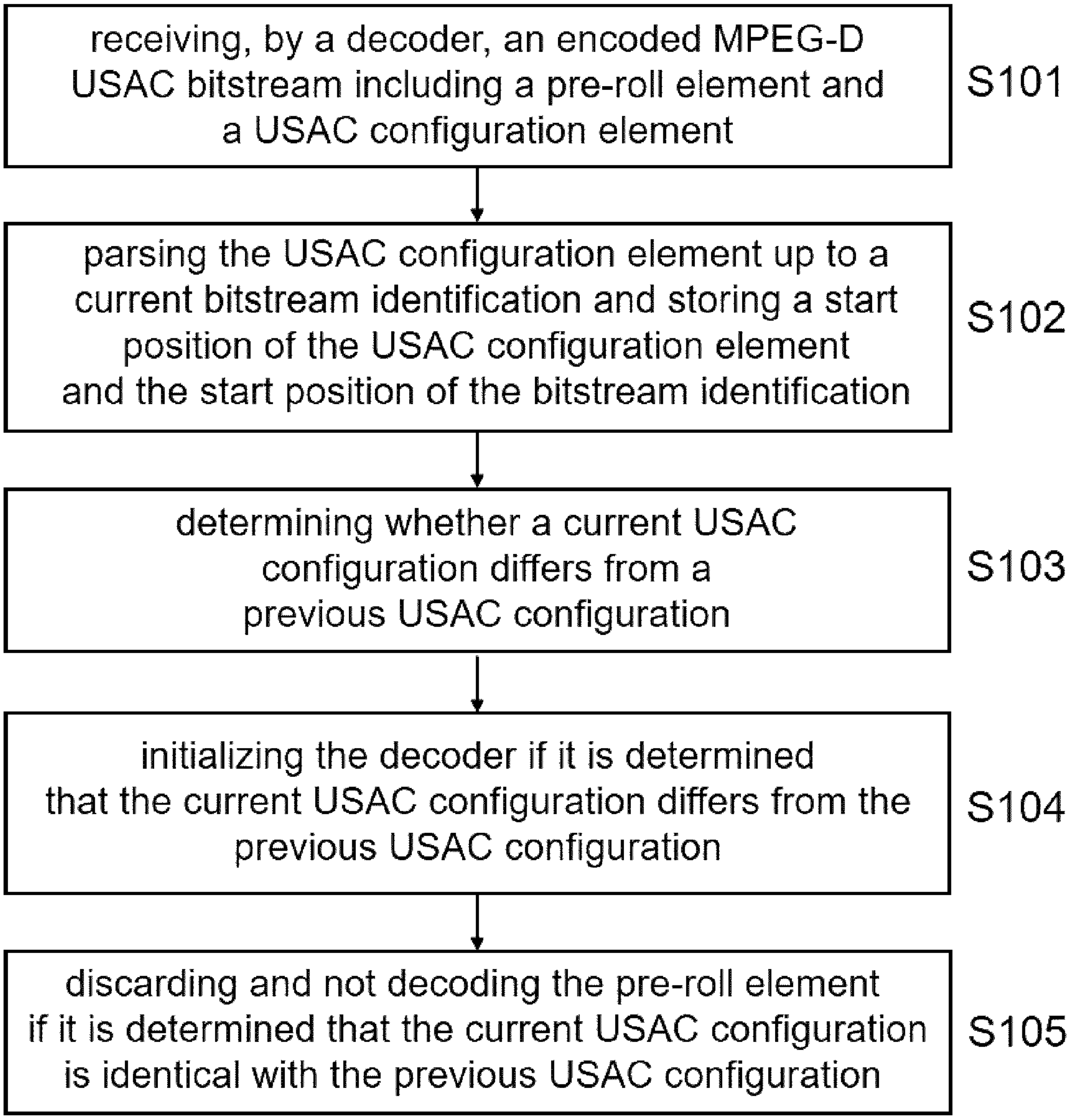
FIG. 2 illustrates an example of a method of decoding, by a decoder, an encoded MPEG-D USAC bitstream.
Figure 4:
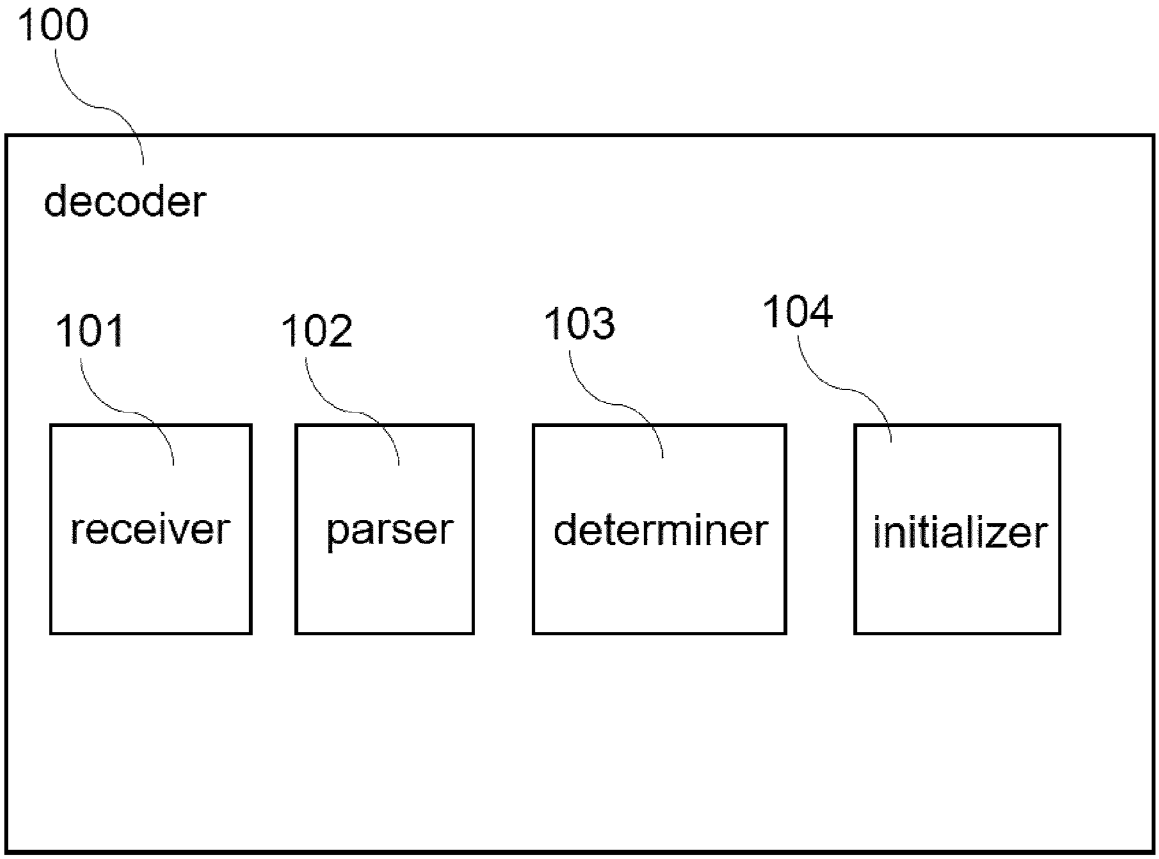
FIG. 4 illustrates an example of a decoder for decoding an encoded MPEG-D USAC bitstream.

Referring now to the examples of FIGS. 2 and 4, a method and a decoder for decoding an encoded MPEG-D USAC bitstream is illustrated. In step S101, an encoded MPEG-D USAC bitstream, is received by a receiver 101. The bitstream represents a sequence of audio sample values and comprises a plurality of frames, wherein each frame comprises associated encoded audio sample values. The bitstream comprises a pre-roll element including one or more pre-roll frames needed by the decoder 100 to build up a full signal so as to be in a position to output valid audio sample values associated with a current frame. The full signal (correct reproduction of audio samples) may, for example, refer to building up a signal, by the decoder during start-up or restart. The bitstream comprises further a USAC configuration element comprising a current USAC configuration as payload and a current bitstream identification (ID_CONFIG_EXT_STREAM_ID). The USAC configuration included in the USAC configuration element may be used, by the decoder 100, as a current configuration if a configuration change occurs. The USAC configuration element may be included in the bitstream as part of the pre-roll element.

In step S102, the USAC configuration element (the pre-roll element) is parsed up, by a parser 102, to the current bitstream identification. Further, a start position of the USAC configuration element and a start position of the current bitstream identification in the bitstream is stored.

Figure 3:
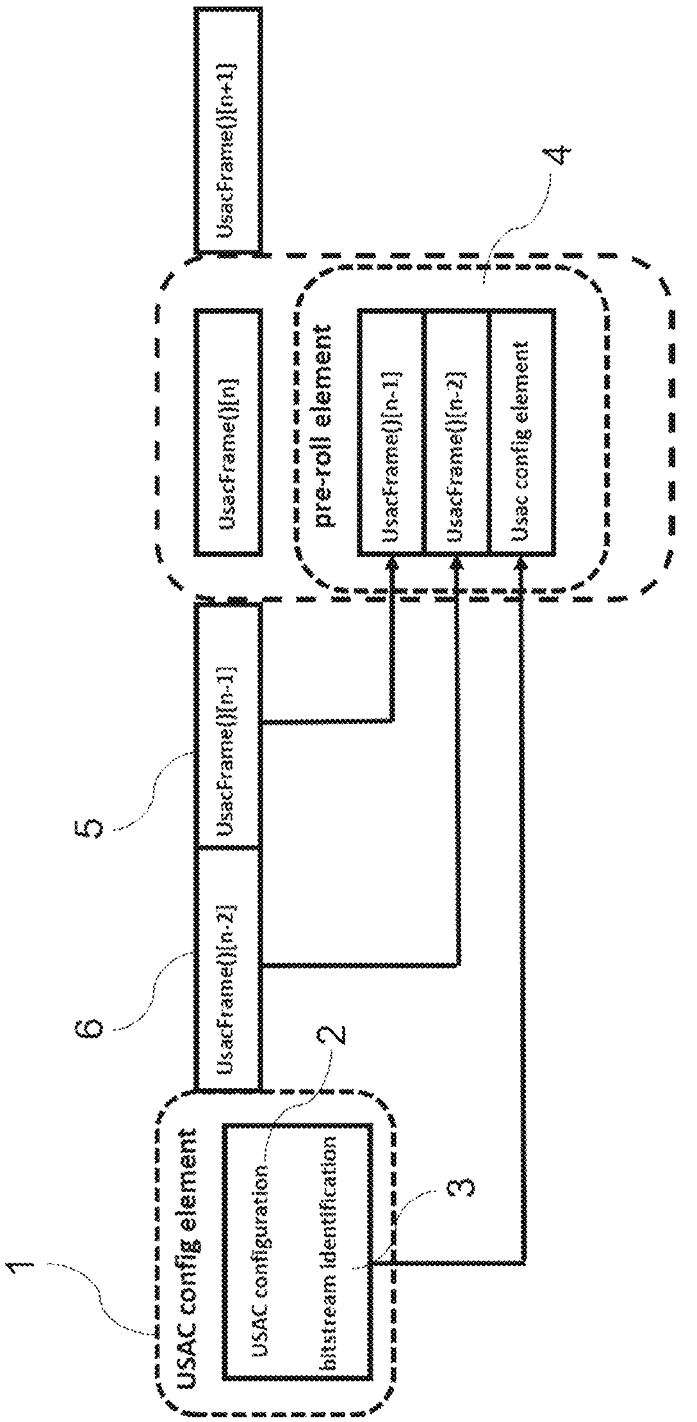
FIG. 3 illustrates an example of an encoded MPEG-D USAC bitstream comprising a pre-roll element and a USAC configuration element.

Referring to the example of FIG. 3, the position of the USAC configuration element 1 in the MPEG-D USAC bitstream in relation to the pre-roll element 4 is schematically illustrated. As illustrated in the example of FIG. 3 and already mentioned above, the USAC configuration element 1 (USAC config element) includes the current USAC configuration 2 and the current bitstream identification 3. The pre-roll element 4 includes the pre-roll frames 5, 6 (UsacFrame ( )[n−1], UsacFrame ( )[n−2]). The current frame is represented by UsacFrame ( )[n]. In the example of FIG. 3, the pre-roll element 4 further includes the USAC configuration element 1. In order to determine a configuration change, the pre-roll element 4 may be parsed up to the USAC configuration element 1 which itself may be parsed up to the current bitstream identification 3.

In step S103, it is then determined, by a determiner 103, whether the current USAC configuration differs from a previous USAC configuration, and, if the current USAC configuration differs from the previous USAC configuration, the current USAC configuration is stored. The stored USAC configuration is then used, by the decoder 100, as the current configuration. The use of a USAC configuration element as described herein thus enables to avoid unnecessary (every time, irrespective of a configuration change) decoding of the pre-roll element, in particular the pre-roll frames included in the pre-roll element.

In an embodiment, it may be determined, by the determiner 103 (the determiner 103 may be configured to determine), whether the current USAC configuration differs from the previous USAC configuration by checking the current bitstream identification against a previous bitstream identification. If the bitstream identification differs, it may be determined that the USAC configuration has changed.

Alternatively, or additionally if the current bitstream identification is determined to be identical with the previous bitstream identification, in an embodiment, it may be determined, by the determiner 103, whether the current USAC configuration differs from the previous USAC configuration by checking a length of the current USAC configuration (config_length_in_bits: length=start of bitstream identification-start of USAC configuration) against the length of the previous USAC configuration. If it is determined that the length differs, it may be determined that the USAC configuration has changed.

In case, the current bitstream identification and/or the length of the current USAC configuration indicate that the USAC configuration has changed, the current USAC configuration is stored. The stored current USAC configuration may then be used later as the previous USAC configuration for comparison if a next USAC configuration element is received. Exemplarily, this may be performed as follows:

a. jump back to start position of USAC config in the bitstream;
b. bulk read (and store) USAC config payload (not parsed) of ((config_length_in_bits+7)/8) bytes.

If it is determined that the current bitstream identification is identical with the previous bitstream identification and/or if it is determined that the length of the current USAC configuration is identical with the length of the previous USAC configuration, in an embodiment, it may be determined, by the determiner 103, whether the current USAC configuration differs from the previous USAC configuration by comparing bytewise the current USAC configuration with the previous USAC configuration. Exemplarily, this may be performed as follows:

a. jump back to start position of USAC config in the bitstream;
b. bulk read byte by byte USAC config payload (not parsed) of ((config_length_in_bits+7)/8) bytes;
c. compare each new payload byte with the according byte of the previous payload;
d. if the byte is different, replace the old (previous) one with the new (current) one;
e. if any replacement has been applied, the USAC configuration has changed.

Referring again to the examples of FIGS. 2 and 4, in step S104, the decoder 100 is initialized, by an initializer 104, if it is determined that the current USAC configuration differs from the previous USAC configuration. Initializing the decoder 100 comprises decoding the one or more pre-roll frames included in the pre-roll element, and switching the decoder 100 from the previous USAC configuration to the current USAC configuration thereby configuring the decoder 100 to use the current USAC configuration if it is determined that the current USAC configuration differs from the previous USAC configuration. If it is determined that the current USAC configuration is identical with the previous USAC configuration, in step S105, the pre-roll element is discarded and not decoded, by the decoder 100. In this, decoding the pre-roll element every time, irrespective of a change in the USAC configuration, can be avoided, as the configuration change can be determined based on the USAC configuration element, i.e. without decoding the pre-roll element.

In an embodiment, the output of valid audio sample values associated with the current frame may be delayed by the decoder 100 by one frame. Delaying the output of valid audio sample values by one frame may include buffering each frame of audio samples before outputting, wherein, if it is determined that the current USAC configuration differs from the previous USAC configuration, crossfading of a frame of the previous USAC configuration buffered in the decoder 100 with a current frame of the current USAC configuration is performed by the decoder 100.

In this regard, it may be considered that an error concealment scheme may be enabled in the decoder 100 which may introduce an additional delay of one frame to the decoder 100 output. Additional delay means that the last output (e.g. PCM) of the previous configuration may still be accessed at the point in time it is determined that the USAC configuration has changed. This enables to start the crossfading (fade out) by 128 samples earlier than described in the MPEG-D USAC standard, i.e. at the end of the last previous frame rather than the start of flushed frame states. Which means that flushing the decoder would not have to be applied at all.

In general, flushing the decoder by one frame is computational complexity wise comparable with decoding a usual frame. Thus, this enables to save the complexity of one frame at a point in time where already (number_of_pre-roll_frames+1)*(complexity for a single frame) would have to be spent which would result in a peak load. Crossfading (or fade in) of the output related to the current (new) configuration may thus already start at the end of the last pre-roll frame. Generally, the decoder has to be flushed with the previous (old) configuration to get additional 128 samples which are used to crossfade to the first 128 samples of the first current (actual) frame (none of the pre-roll frames) with the current (new) configuration.

Figure 5:
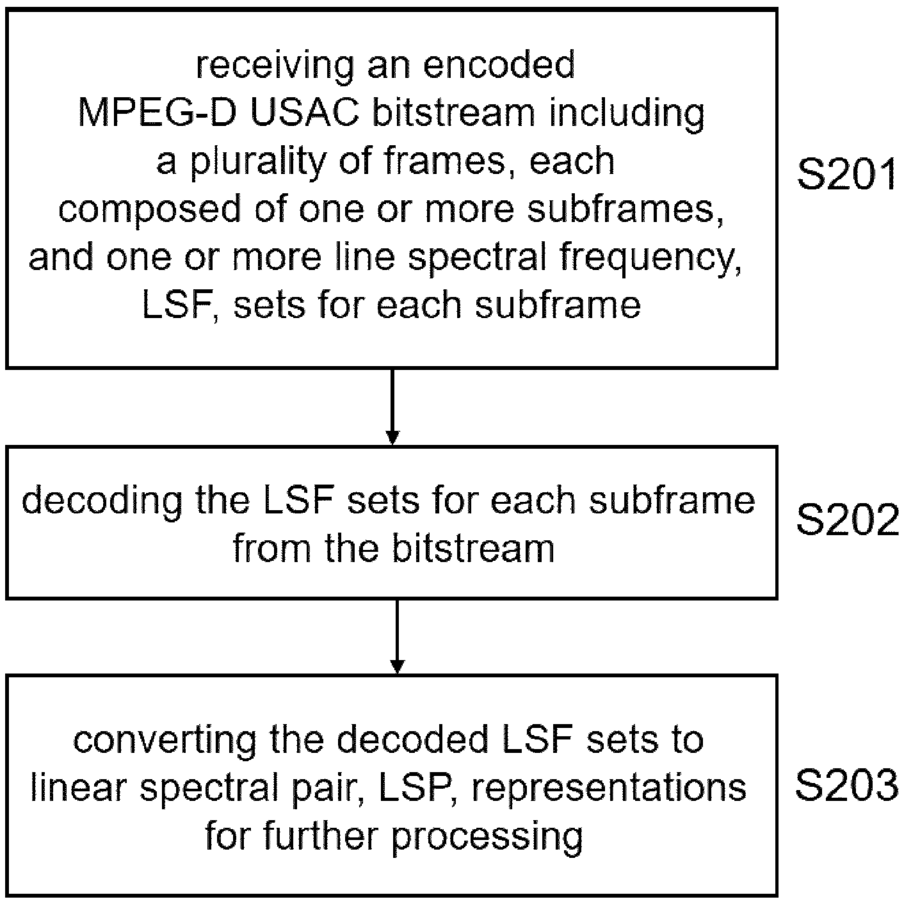
FIG. 5 illustrates an example of a method of decoding an encoded MPEG-D USAC bitstream, the encoded bitstream including a plurality of frames, each composed of one or more subframes, wherein the encoded bitstream includes, as a representation of linear prediction coefficients, LPCs, one or more line spectral frequency, LSF, sets for each subframe.

Referring now to the example of FIG. 5, a method of decoding an encoded MPEG-D USAC bitstream, the encoded bitstream including a plurality of frames, each composed of one or more subframes, wherein the encoded bitstream includes, as a representation of linear prediction coefficients, LPCs, one or more line spectral frequency, LSF, sets for each subframe, is illustrated. In step S201, the encoded MPEG-D USAC bitstream is received. Decoding the encoded bitstream then includes in step S202 decoding, by a decoder (the decoder is configured to decode), the LSF sets for each subframe from the bitstream. In step S203, the decoded LSF sets are then converted, by the decoder, to linear spectral pair, LSP, representations for further processing.

Generally, LSPs have several properties (e.g. smaller sensitivity to quantization noise) that make them superior to direct quantization of LPCs.

Figure 6:
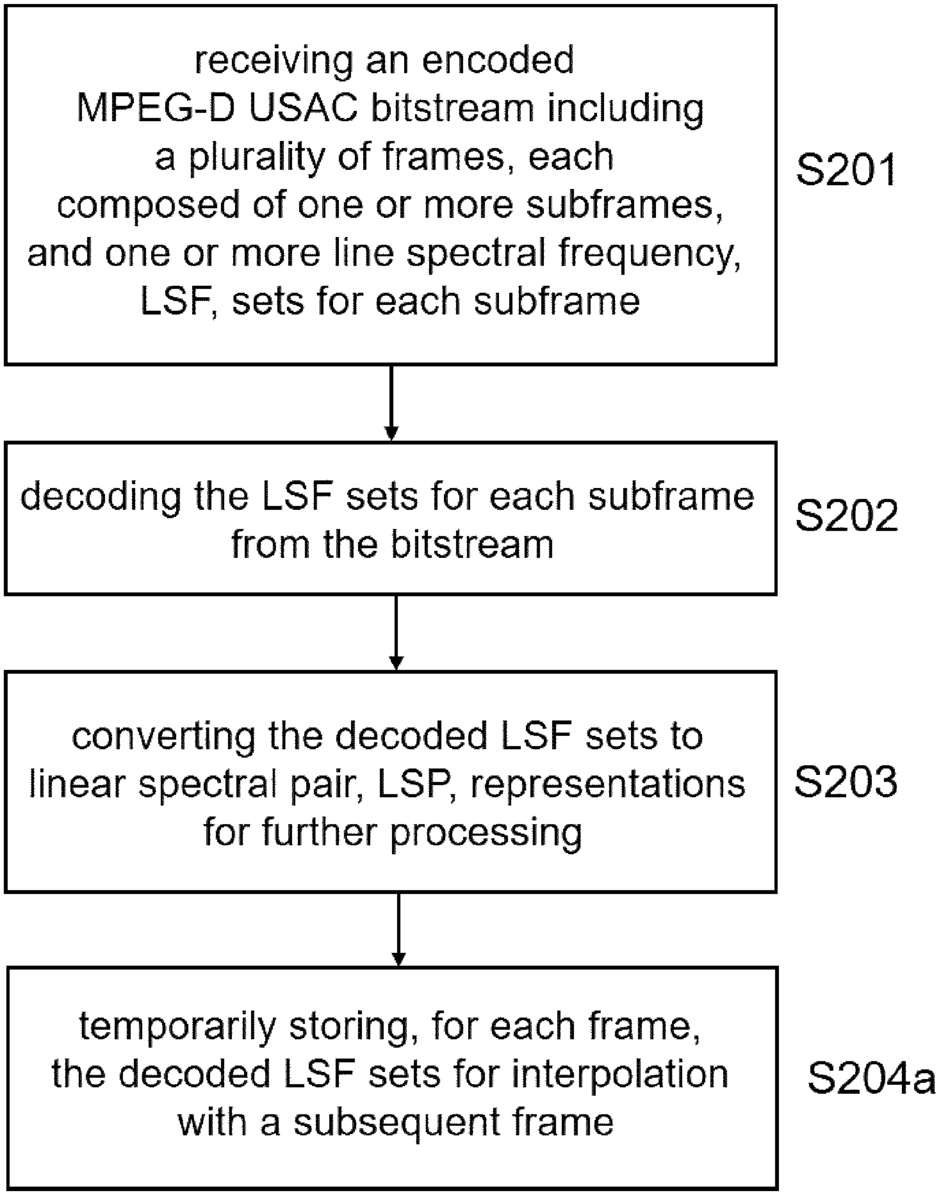
FIG. 6 illustrates a further example of a method of decoding an encoded MPEG-D USAC bitstream, the encoded bitstream including a plurality of frames, each composed of one or more subframes, wherein the encoded bitstream includes, as a representation of linear prediction coefficients, LPCs, one or more line spectral frequency, LSF, sets for each subframe, wherein the method includes temporarily storing, for each frame, the decoded LSF sets for interpolation with a subsequent frame.

Referring to the example of FIG. 6, in an embodiment, for each frame, the decoded LSF sets may be temporarily stored by the decoder for interpolation with a subsequent frame, S204*a*. In this regard, it may also be sufficient to save only the last set in LSF representation, as the last set from the previous frame is required for interpolation purposes. Temporarily storing the LSF sets enables to directly use the LSF sets:

```
if (!p_lpd_data->first_lpd_flag) {
   memcpy(lsf, h_lpd_dec->lsf_prev, LPD_ORDER *sizeof(DLB_LFRACT));
}
```

without the need to convert the last set saved in LSP representation to LSF:

```
if (!first_lpd_flag) {
   ixheaacd_lsp_2_lsf_conversion(st->lspold, lsf_flt, ORDER);
}
```

Figure 7:
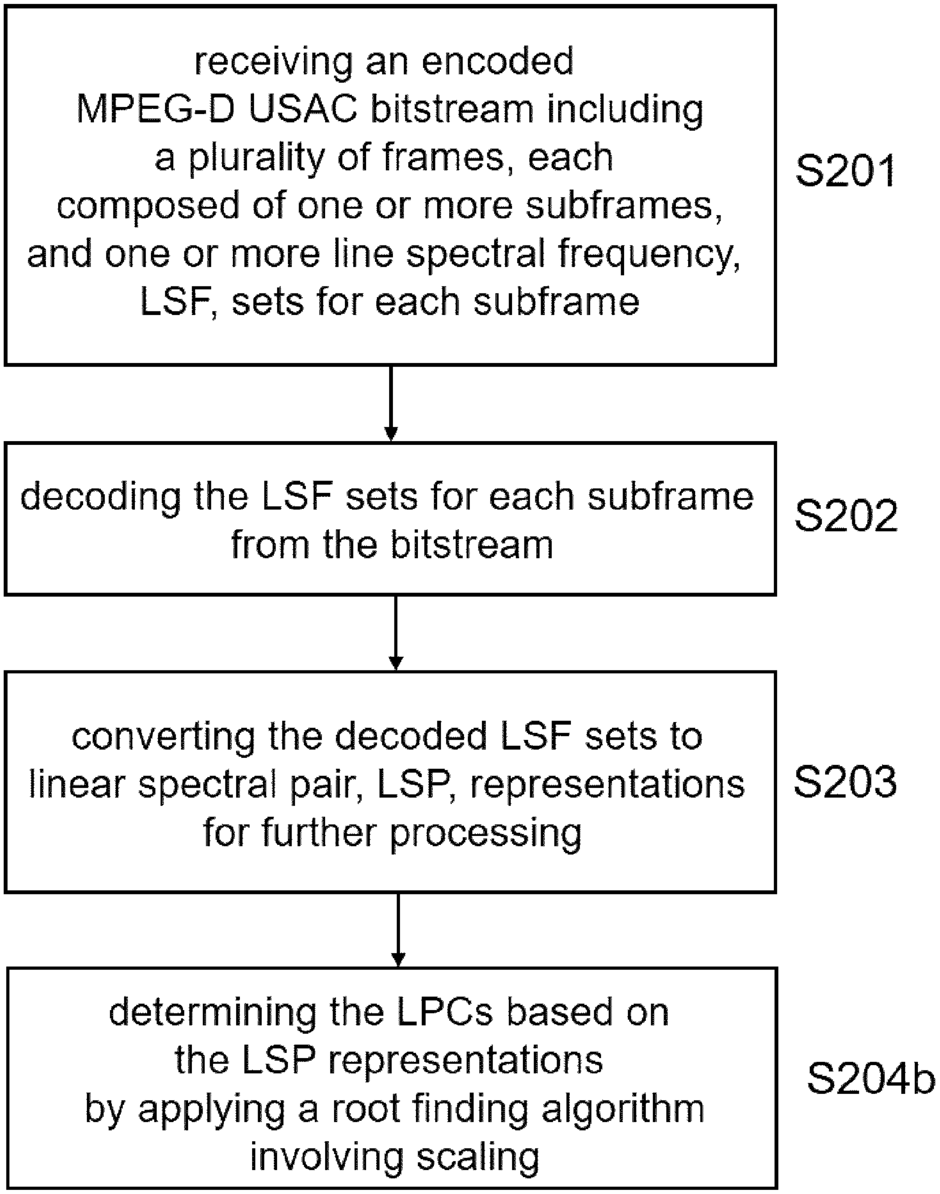
FIG. 7 illustrates yet a further example of a method of decoding an encoded MPEG-D USAC bitstream, the encoded bitstream including a plurality of frames, each composed of one or more subframes, wherein the encoded bitstream includes, as a representation of linear prediction coefficients, LPCs, one or more line spectral frequency, LSF, sets for each subframe.

Referring to the example of FIG. 7, alternatively or additionally, in an embodiment, the further processing may include determining the LPCs based on the LSP representations by applying a root finding algorithm, wherein applying the root finding algorithm may involve scaling, S204*b*. The coefficients of the LSP representations may be scaled within the root finding algorithm to avoid overflow in a fixed point range.

In an embodiment, applying the root find algorithm may involve finding polynomial F1(z) and/or F2(z) from the LSP representations by expanding respective product polynomials, wherein scaling may be performed as a power of 2 scaling of the polynomial coefficients. This defines a left bit-shift operation 1<<LPD_COEFF_SCALE with default LPD_COEFF_SCALE value being 8. Exemplarily, this may be performed as follows.

The LSP representation of the LP polynomial consists simply of the location of the roots P and Q, i.e. ω such that $z=e^{i\omega}$, P(z)=0. As they occur in pairs, only half of the actual roots (conventionally between 0 and π) need to be transmitted. The total number of coefficients for both P and Q is therefore equal to p, the number of original LP coefficients (not counting $a_0=1$). A common algorithm for finding these is to evaluate the polynomial at a sequence of closely spaced points around the unit circle, observing when the result changes sign; when it does, a root must lie between the points tested. Because the roots of P are interspersed with those of Q, a single pass is sufficient to find the roots of both polynomials. While the LSPs are in range [−1..1] by design (cos ( ), this is not the case for the LP coefficients. Scaling within the root finding algorithm thus has to be performed. In the following, a respective example code is given:

Find the polynomial F1(z) or F2(z) from the LSPs.

This is performed by expanding the product polynomials:

F1(z)=product (1-2 LSP_i z^−1+z^−2)
  i=0,2,4,6,8,10,12,13

F2(z)=product (1-2 LSP_i z^−1+z^−2)
  i=1,3,5,7,9,11,13,15 where LSP_i are the LSPs in the cosine domain.

R. A. Salami October 1990

The pseudocode, as illustrated in the following, implements the above-mentioned scaling (and is not part of the R. A. Salami algorithm):

```
f1[0] = 1 / 256
f2[0] = 1 / 256
LOOP i = 1 .. 8
  b1 = − LSP[(i−1) * 2)
  b2 = − LSP[(i−1) * 2 + 1)
  f1[i] = 2 * (b1 * f1[i − 1] + f1[i − 2]);
  f2[i] = 2 * (b2 * f2[i − 1] + f2[i − 2]);
  LOOP j = i − 1 .. 1
    for (j = i − 1; j > 0; j−−) (
      f1[j] += (2 * b1 * f1[j − 1] ) + f1[j − 2];
      f2[j] += (2 * b2 * f2[j − 1] ) + f2[j − 2];
  END LOOP
END LOOP
```

Scaling within the root finding algorithm to avoid overflows in the fixed point range:

```
#define LPD_COEFF_SCALE 8
static void lpd_compute_coeff_poly(DLB_LFRACT lsp[ ],
  DLB_LFRACT b1, b2;              DLB_LFRACT *f1,
  DLB_LFRACT *ptr_lsp;            DLB_LFRACT *f2) {
  const DLB_LFRACT one_scl = DLB_LcF(1.0f / (1 << LPD_COEFF_SCALE));
  int i, j;
  ptr_lsp = lsp;
  f1[0] = f2[0] = one_scl;
  for (i = 1; i <= LPD_ORDER_BY_2; i++) {
    b1 = DLB_LnegL (*ptr_lsp++);
    b2 = DLB_LnegL (*ptr_lsp++);
    f1[i] = DLB LshlLI(DLB LaddLL(DLB _LmpyLL(b1, f1[i − 1]), f1[i −
2]), 1);
    f2[i] = DLB_LshlLI(DLB_LaddLL(DLB_LmpyLL(b2, f2[i − 1]), f2[i −
2]), 1);
    for (j = i − 1; j > 0; j −−) {
      f1[j] = DLB_LaddLL(f1[j], DLB_LaddLL(DLB_LshlLI(DLB_LmpyLL(b1,
f1[j − 1]), 1), f1[j − 2]));
      f2[j] = DLB_LaddLL(f2[j], DLB_LaddLL(DLB_LshlLI(DLB_LmpyLL(b2,
f2[j − 1]), 1) , f2[j − 2]));
    }
  }
  return;
}
void lpd_lsp_to_lp_conversion(DLB_LFRACT *lsp,
                          DLB_LFRACT *lp_coff_a)
{
  int i;
  DLB_LFRACT *ppoly_f1, *ppoly_f2;
  DLB_LFRACT *plp_coff_a_bott, *plp_coff_a_top;
  DLB_LFRACT polyl [LPD_ORDER_BY_2 + 2], poly2[LPD_ORDER_BY_2 + 2];
  const DLB_LFRACT one_scl = DLB_LcF(1.0f / (1 << LPD_COEFF_SCALE));
  poly1[0] = DLB_L00;
  poly2[0] = DLB_L00;
  lpd_compute_coeff_poly(isp, &poly1[1], &poly2[1]) ;
  ppoly_f1 = poly1 + LPD_ORDER_BY_2 + 1;
  ppoly_f2 = poly2 + LPD_ORDER_BY_2 + 1;
  for (i = 0; i < LPD_ORDER_BY_2; i++) {
    ppoly_f1[0] = DLB_LaddLL( ppoly_f1[0], ppoly_f1[−1]);
    ppoly_f2[0] = DLB_LsubLL( ppoly_f2[0], ppoly_f2[−1]);
    ppoly_f1−−;
    ppoly_f2−−;
  }
```

-continued

```
  plp_coff_a_bott = lp_coff_a;
  *plp_coff_a_bott++ = one_scl;
  plp_coff_a_top = lp_coff_a + LPD_ORDER;
  ppoly_f1 = poly1 + 2;
  ppoly_f2 = poly2 + 2;
  for (i = 0; i < LPD_ORDER_BY_2; i++) {
    *plp_coff_a_bott++ = DLB_LmpyLL(DLB_LaddLL(*ppoly_f1, *ppoly_f2),
DLB_L05);
    *plp_coff_a_top-- = DLB_LmpyLL(DLB_LsubLL(*ppoly_f1, *ppoly_f2),
DLB_L05);
    ppoly_f1++;
    ppoly_f2++;
  }
  return;
}
```

In some embodiments, the decoder may be configured to retrieve quantized LPC filters and to compute their weighted versions and to compute corresponding decimated spectrums, wherein a modulation may be applied to the LPCs prior to computing the decimated spectrums based on pre-computed values that may be retrieved from one or more look-up tables.

In general, in transform coded excitation (TCX) gain calculation, prior to applying an inverse modified discrete cosine transform (MDCT), the two quantized LPC filters corresponding to both extremities of the MDCT block (i.e. the left and right folding points) may be retrieved, their weighted versions may be computed, and the corresponding decimated spectrums may be computed. These weighted LPC spectrums may be computed by applying an odd discrete Fourier transform (ODFT) to the LPC filter coefficients. A complex modulation may be applied to the LPC coefficients before computing the ODFT so that the ODFT frequency bins may be perfectly aligned with the MDCT frequency bins. This may be described in clause 7.15.2 of the USAC standard, for example. This clause is hereby incorporated by reference in its entirety. Since the only possible values for M (ccfl/16) may be 64 and 48, a table look-up for this complex modulation can be used.

An example of a modulation using a look-up table is given in the following:

```
void lpd_lpc_to_td(DLB_LFRACT *coeff, int order, DLB_LFRACT *gains, int
lg) {
...
size_n = 2 * lg;
  switch(lg){
    case 48:
      cos_ table = lpd_cos_ table_48;
      sin_table = lpd_sin_ table_48;
    break;
    case 64:
      cos_table = lpd_cos_table_64;
      sin_table = lpd_sin_ table_64;
    break;
}
for (i = 0; i < order + 1; i++) {
    data_in[2 * i] = DLB_ LmpyLL(coeff[i], cos_table[i]); /* cos(i * PI/ s
    data_in[2 * i + 1] = DLB_LnegL(DLB_LmpyLL(coeff[i], sin_table[i]));
/* sin(i * PI/ s
}
for (; i < size_n; i++) {
    data_in[2 * i] = DLB_ LOO;
    data_in[2 * i + 1] = DLB_L00;
}
```

Figure 8:
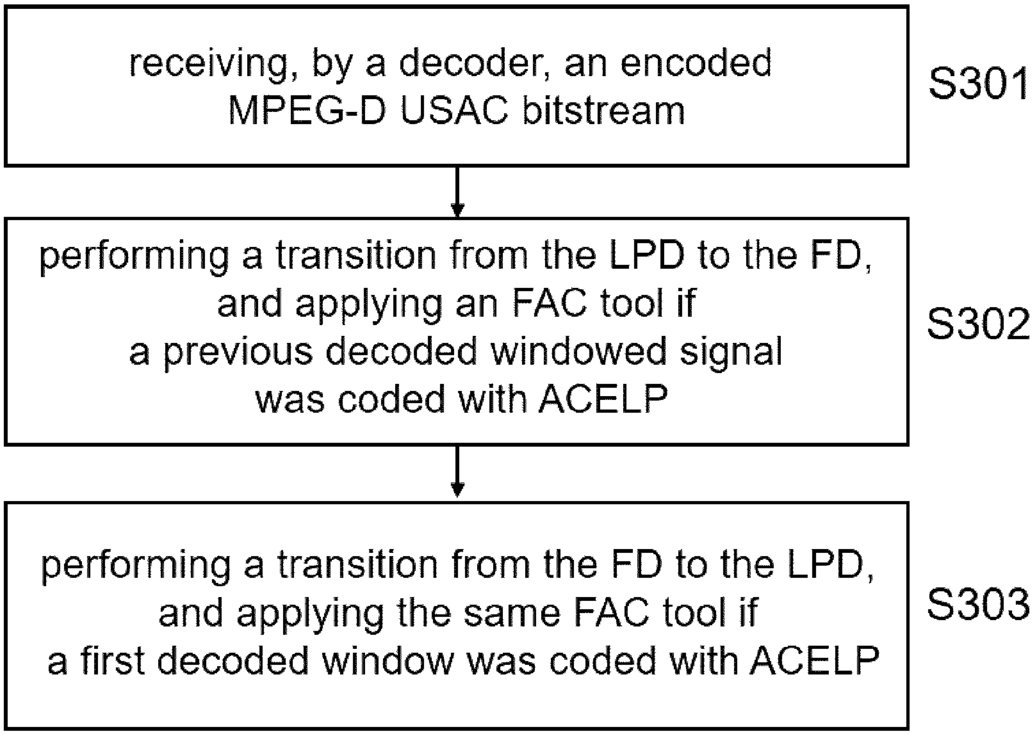
FIG. 8 illustrates an example of a method of decoding an encoded MPEG-D USAC bitstream by a decoder implementing a forward-aliasing cancellation, FAC, tool, for canceling time-domain aliasing and/or windowing when transitioning between Algebraic Code Excited Linear Prediction, ACELP, coded frames and transform coded, TC, frames within a linear prediction domain, LPD, codec.
Figure 9:
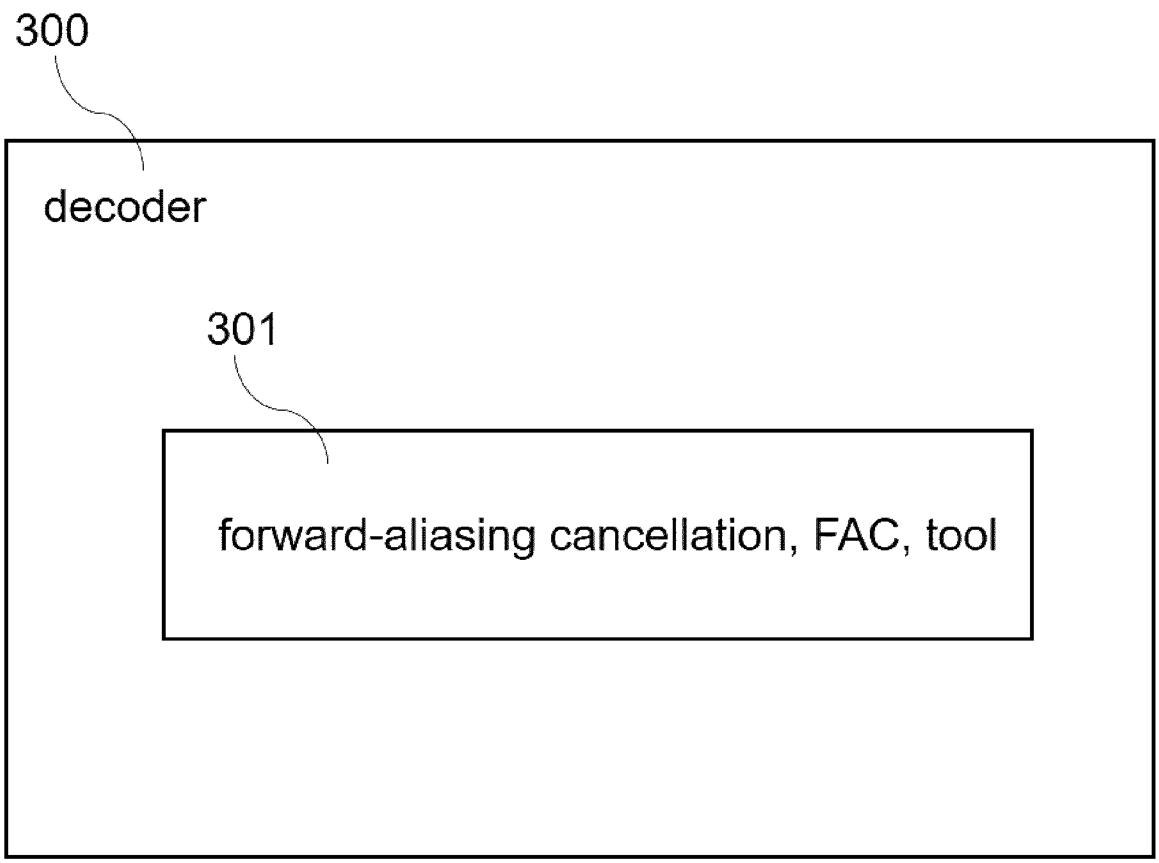
FIG. 9 illustrates an example of a decoder for decoding an encoded MPEG-D USAC bitstream, wherein the decoder is configured to implement a forward-aliasing cancellation, FAC, tool, for canceling time-domain aliasing and/or windowing when transitioning between Algebraic Code Excited Linear Prediction, ACELP, coded frames and transform coded, TC, frames within a linear prediction domain, LPD, codec.

Referring now to the examples of FIGS. 8 and 9, a method of decoding an encoded MPEG-D USAC bitstream by a decoder implementing a forward-aliasing cancellation, FAC, tool, for canceling time-domain aliasing and/or windowing when transitioning between Algebraic Code Excited Linear Prediction, ACELP, coded frames and transform coded, TC, frames within a linear prediction domain, LPD, codec is illustrated.

The FAC tool may be described in clause 7.16 of the USAC standard, for example. This clause is hereby incorporated by reference in its entirety. Generally, forward-aliasing cancellation (FAC) is performed during transitions between ACELP and TC frames within the LPD codec in order to get the final synthesis signal. The goal of FAC is to cancel the time-domain aliasing and windowing introduced by TC and which cannot be cancelled by the preceding or following ACELP frame.

In step S301, an encoded MPEG-D USAC bitstream is received by the decoder 300. In step S302, a transition from the LPD to the frequency domain, FD is performed, and the FAC tool 301 is applied if a previous decoded windowed signal was coded with ACELP. Further, in step S 303, a transition from the FD to the LPD is performed, and the (same) FAC tool 301 is applied if a first decoded window was coded with ACELP. Which transition is going to be performed may be determined during the decoding process, as this is dependent on how the MPEG-D USAC bitstream has been encoded. Using just one function (lpd_fwd_alias_cancel_tool ( )) enables using less code and less memory and thus to reduce computational complexity.

In an embodiment, further an ACELP zero input response (ACELP ZIR) may be added, when the FAC tool 301 is used for the transition from FD to LPD. The ACELP ZIR may be the actually synthesized output signal of the last ACELP coded subframe, which is used, in combination with the FAC tool to generate the first new output samples after codec switch from LPD to FD. Adding ACELP ZIR to the FAC tool (e.g., as an input to the FAC tool) enables a seamless transition from the FD to the LPD and/or to use the same FAC tool for transitions from the LPD to the FD and/or from the FD to the LPD.

As noted above, the same FAC tool may be applied to both transitions from the LPD to the FD and from the FD to the LPD. Here, using the same tool may mean that the same function in the code of a decoding application is applied (or called), regardless of the transition between the LPD and the FD, or vice versa. This function may be the lpd_fwd_alias_cancel_tool( )function described below, for example.

The function implementing the FAC tool (e.g., the function lpd_fwd_alias_cancel_tool ( )) may receive information relating to the filter coefficients, ZIR, subframe length, FAC length, and/or the FAC signal as an input. In the example code presented below, this information may be represented by *lp_filt_coeff (filter coefficients), *zir (ZIR), len_subfrm (subframe length), fac_length (FAC length), and *fac_signal (FAC signal).

As noted above, the function implementing the FAC tool (e.g., the function lpd_fwd_alias_cancel_tool ( )) may be designed such that it can be called during any instances of the decoding, regardless of the current coding domain (e.g., LPD or FD). This means that the same function and be called when switching from the FD to the LPD, or vice versa. Accordingly, the proposed FAC tool or function implementing the FAC tool provides a technical advantage or improvement over prior implementations with regard to code execution in decoding. Also, the resulting flexibility in decoding allows for code optimizations not available under prior implementations (e.g., implementations 5 that use different function for implementing FAC tools in the FD and the LPD).

An example code for a function implementing the FAC tool is given in the following:

```
void lpd_fwd_alias_cancel_tool (p_fac_data_t       p_fac,
                               DLB_LFRACT   *lp_filt_coeff,
                               DLB_LFRACT   *zir,
                               int          len_subfrm,
                               int          fac_length,
                               DLB_LFRACT   *fac_signal
                               }
{
...
/* add ACELP Zir, if available */
   if (zir != NULL) {
      for (i = 0; i < fac_length; i++) {
         facWindow[i] = DLB_LmpyLL(sineWindow[i], sineWindow[(2 *
fac_length) − 1 − i]);
         facWindow[fac_length + i] = DLB_LsubLL(DLB_L10,
DLB_LmpyLL(sineWindow[fac_length + i], sineWindow[fac_length + i]));
      }
      for (i = 0; i < fac_length; i++) {
         ptr_fac_signal_buf[i] = DLB_LaddLL(ptr_fac_signal_buf[i],
DLB_LaddLL(DLB_LmpyLL(zir[1 + len_subfrm/2 + i], facWindow[fac_length +
i]),
DLB LmpyLL(zir[1 + len_subfrm/2 − 1 − i], facWindow[fac_length − 1 −
i])));
      }
   }
...
}
/* call when switching from FD to LPD from lpd_dec_decode( ) */
int lpd_dec_decode
      (p_lpd_dec_instance_t      h_lpd_dec
      ,p_ldp_data_t              p_lpd_data
      ,p_fac_data_t              p_fac
      ,void                     *p_scratch
      ,DLB_LFRACT               *overlap_data_ptr
      ,unsigned int             *p_seed
      ,DLB_TIMEDATA             *time out
      }
{
...
      lpd_fwd_alias_cancel_tool(p_fac, lp_coff_a, NULL, len_subfrm,
fac_length, fac_signal);
...
}
/* call when switching from LDP to FD from lpd_dec_calc_fac_data( ) */
int lpd_dec_calc_fac_data
      (p_lpd_dec_instance_t      h_lpd_dec
      ,p_fac_data_t              p_fac
      ,int                       is_short_flag
      ,void                     *p_scratch
      ,DLB_LFRACT               *fac signal
      }
```

-continued

```
{
    int fac_length;
    if(is_short_flag){
    fac_length = h_lpd_dec->len_subfrm/4;
    }
    else {
       fac_length = h_lpd_dec->len_subfrm/2;
    }
    lpd_fwd_alias_cancel_tool(p_fac, &h_lpd_dec-
>lp_coeff_a_prev[LPD_ORDER+1], h_lpd_dec->exc_prev, h_lpd_dec-
>len_subfrm, fac_length, fac_signal);
    return 0;
}
```

As can be seen from the above example code, the function lpd_fwd_alias_cancel_tool ( ) implementing the FAC tool can be called regardless of the current coding domain (e.g., FD or LPD) and can appropriately handle transitions between coding domains.

Figure 10:
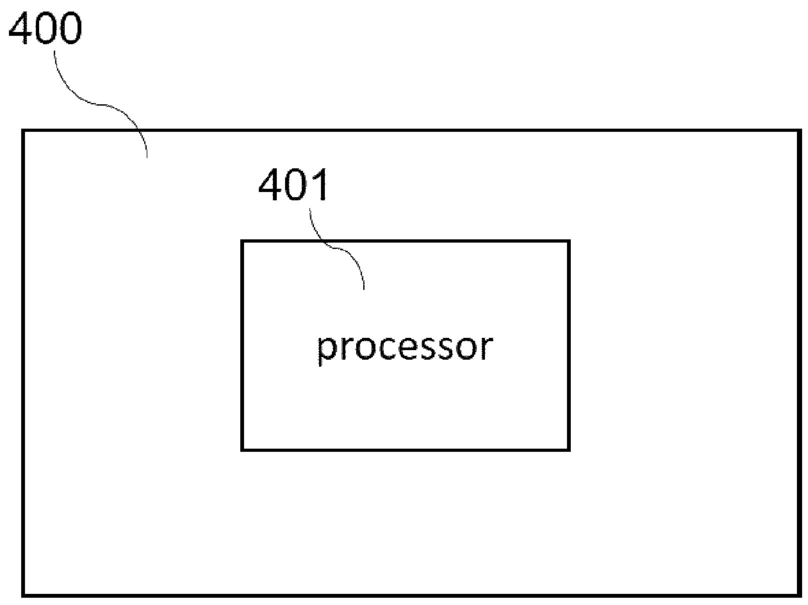
FIG. 10 illustrates an example of a device having processing capability.

Referring to the example of FIG. 10, it is to be noted that the methods as described herein may also be implemented by respective computer program products with instructions adapted to cause a device 400 having processing capability 401 to carry out said methods.

Interpretation

Unless specifically stated otherwise, as apparent from the following discussions, it is appreciated that throughout the disclosure discussions utilizing terms such as "processing," "computing," "determining", analyzing" or the like, refer to the action and/or processes of a computer or computing system, or similar electronic devices, that manipulate and/or transform data represented as physical, such as electronic, quantities into other data similarly represented as physical quantities.

In a similar manner, the term "processor" may refer to any device or portion of a device that processes electronic data to transform that electronic data into other electronic data. A "computer" or a "computing machine" or a "computing platform" may include one or more processors.

As stated above, the methods described herein may be implemented as a computer program product with instructions adapted to cause a device having processing capability to carry out said methods. Any processor capable of executing a set of instructions (sequential or otherwise) that specify actions to be taken are included. Thus, one example may be a typical processing system that may include one or more processors. Each processor may include one or more of a CPU, a graphics processing unit, tensor processing unit and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD), a light emitting diode display (LED) of any kind, for example, including OLED (organic light emitting diode) displays, or a cathode ray tube (CRT) display. If manual data entry is required, the processing system may also include an input device such as one or more of an alphanumeric input unit such as a keyboard, a pointing control device such as a mouse, and so forth. The processing system may also encompass a storage system such as a disk drive unit. The processing system may include a sound output device, for example one or more loudspeakers or earphone ports, and a network interface device.

A computer program product may, for example, be software. Software may be implemented in various ways. Software may be transmitted or received over a network via a network interface device or may be distributed via a carrier medium. A carrier medium may include but is not limited to, non-volatile media, volatile media, and transmission media. Non-volatile media may include, for example, optical, magnetic disks, and magneto-optical disks. Volatile media may include dynamic memory, such as main memory. Transmission media may include coaxial cables, copper wire and fiber optics, including the wires that comprise a bus subsystem. Transmission media may also take the form of acoustic or light waves, such as those generated during radio wave and infrared data communications. For example, the term "carrier medium" shall accordingly be taken to include, but not be limited to, solid-state memories, a computer product embodied in optical and magnetic media; a medium bearing a propagated signal detectable by at least one processor or one or more processors and representing a set of instructions that, when executed, implement a method; and a transmission medium in a network bearing a propagated signal detectable by at least one processor of the one or more processors and representing the set of instructions.

Note that when the method to be carried out includes several elements, e.g., several steps, no ordering of such elements is implied, unless specifically stated otherwise.

It will be understood that the steps of methods discussed are performed in one example embodiment by an appropriate processor (or processors) of a processing (e.g., computer) system executing instructions (computer-readable code) stored in storage. It will also be understood that the disclosure is not limited to any particular implementation or programming technique and that the disclosure may be implemented using any appropriate techniques for implementing the functionality described herein. The disclosure is not limited to any particular programming language or operating system.

Reference throughout this disclosure to "one embodiment", "some embodiments" or "an embodiment" means that a particular feature described in connection with the embodiment is included in at least one embodiment of the present disclosure. Thus, appearances of the phrases "in one embodiment", "in some embodiments" or "in an embodiment" in various places throughout this disclosure are not necessarily all referring to the same embodiment. Furthermore, the particular features may be combined in any suitable manner, as would be apparent to one of ordinary skill in the art from this disclosure, in one or more embodiments.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. Any one of the terms including or which includes or that includes as used herein is also an open term that also means including at least the elements/features that follow the term, but not excluding others. Thus, including is synonymous with and means comprising.

It should be appreciated that in the above description of example embodiments of the disclosure, various features of the disclosure are sometimes grouped together in a single example embodiment, Fig., or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed example embodiment. Thus, the claims following the Description are hereby expressly incorporated into this Description, with each claim standing on its own as a separate example embodiment of this disclosure.

Furthermore, while some example embodiments described herein include some but not other features included in other example embodiments, combinations of features of different example embodiments are meant to be within the scope of the disclosure, and form different example embodiments, as would be understood by those skilled in the art. For example, in the following claims, any of the claimed example embodiments can be used in any combination.

In the description provided herein, numerous specific details are set forth. However, it is understood that example embodiments of the disclosure may be practiced without these specific details. In other instances, well-known methods, device structures and techniques have not been shown in detail in order not to obscure an understanding of this description.

Thus, while there has been described what are believed to be the best modes of the disclosure, those skilled in the art will recognize that other and further modifications may be made thereto without departing from the spirit of the disclosure, and it is intended to claim all such changes and modifications as fall within the scope of the disclosure. For example, steps may be added or deleted to methods described within the scope of the present disclosure.

The invention claimed is:

1. A decoder for decoding an encoded MPEG-D USAC bitstream, the decoder comprising:

a receiver, implemented by a processor, to receive the encoded bitstream, wherein the bitstream represents a sequence of audio sample values and comprises a plurality of frames, wherein each frame comprises associated encoded audio sample values, wherein the bitstream comprises a pre-roll element including one or more pre-roll frames needed by the decoder to build up a full signal so as to be in a position to output valid audio sample values associated with a current frame, and wherein the bitstream further comprises a USAC configuration element comprising a current USAC configuration as payload and a current bitstream identification;

a parser, implemented by a processor, to parse the USAC configuration element up to the current bitstream identification and to store a start position of the USAC configuration element and a start position of the current bitstream identification in the bitstream;

a determiner, implemented by a processor, to determine whether the current USAC configuration differs from a previous USAC configuration by checking a length of the current USAC configuration config_length_in_bits against the length of the previous USAC configuration, and, if the current USAC configuration differs from the previous USAC configuration, store the current USAC configuration, wherein the determiner is configured to jump back to the start position of the USAC configuration element in the bitstream and to bulk read and store the unparsed USAC configuration payload of (config_length_in_bits+7)/8) bytes; and an initializer, implemented by a processor, to initialize the decoder if the determiner determines that the current USAC configuration differs from the previous USAC configuration, wherein initializing the decoder comprises:

decoding the one or more pre-roll frames included in the pre-roll element, switching the decoder from the previous USAC configuration to the current USAC configuration, thereby configuring the decoder to use the current USAC configuration if the determiner determines that the current USAC configuration differs from the previous USAC configuration, and wherein the decoder discards and does not decode the pre-roll element if the determiner determines that the current USAC configuration is identical with the previous USAC configuration.

2. The decoder according to claim 1, wherein the determiner determines whether the current USAC configuration differs from the previous USAC configuration by checking the current bitstream identification against a previous bitstream identification.

3. The decoder according to claim 1, wherein, if it is determined that the current bitstream identification is identical with the previous bitstream identification and/or if it is determined that the length of the current USAC configuration is identical with the length of the previous USAC configuration, the determiner is configured to determine whether the current USAC configuration differs from the previous USAC configuration by comparing bytewise the current USAC configuration with the previous USAC configuration.

4. The decoder according to claim 1, wherein the decoder delays the output of valid audio sample values associated with the current frame by one frame, wherein delaying the output of valid audio sample values by one frame includes buffering each frame of audio samples before outputting and wherein the decoder is further configured, if it is determined that the current USAC configuration differs from the previous USAC configuration, to perform crossfading of a frame of the previous USAC configuration buffered in the decoder with the current frame of the current USAC configuration.

5. A method of decoding, by a decoder, an encoded MPEG-D USAC bitstream, the method comprising:

receiving the encoded bitstream, wherein the bitstream represents a sequence of audio sample values and comprises a plurality of frames, wherein each frame comprises associated encoded audio sample values, wherein the bitstream comprises a pre-roll element including one or more pre-roll frames needed by the decoder to build up a full signal so as to be in a position to output valid audio sample values associated with a current frame, and wherein the bitstream further comprises a USAC configuration element comprising a current USAC configuration as payload and a current bitstream identification;

parsing the USAC configuration element up to the current bitstream identification and storing a start position of the USAC configuration element and a start position of the current bitstream identification in the bitstream;

determining whether the current USAC configuration differs from a previous USAC configuration by checking a length of the current USAC configuration config_length_in_bits against the length of the previous USAC configuration, and, if the current USAC configuration differs from the previous USAC configuration, storing the current USAC configuration, wherein the determining includes jumping back to the start position of the USAC configuration element in the bitstream and bulk reading and storing the unparsed USAC configuration payload of (config_length_in_bits+7)/8) bytes; and initializing the decoder if it is determined that the current USAC configuration differs from the previous USAC configuration, wherein initializing the decoder comprises:

decoding the one or more pre-roll frames included in the pre-roll element, and switching the decoder from the previous USAC configuration to the current USAC configuration thereby configuring the decoder to use the current USAC configuration if it is determined that the current USAC configuration differs from the previous USAC configuration, wherein the method further comprises:

discarding and not decoding, by the decoder, the pre-roll element if it is determined that the current USAC configuration is identical with the previous USAC configuration.

6. A decoder for decoding an encoded MPEG-D USAC bitstream, the encoded bitstream including a plurality of frames, each composed of one or more subframes, wherein the encoded bitstream includes, as a representation of linear prediction coefficients, LPCs, one or more line spectral frequency, LSF, sets for each subframe, wherein the decoder includes a processor for:

decoding the encoded bitstream, and wherein decoding the encoded bitstream by the processor comprises:

decoding the LSF sets for each subframe from the bitstream; and converting the decoded LSF sets to linear spectral pair, LSP, representations, determining the LPCs based on the LSP representations by applying a root finding algorithm, and wherein applying the root finding algorithm involves scaling of coefficients of the LSP representations within the root finding algorithm to avoid overflow in a fixed point range, wherein the decoder temporarily stores, for each frame, the decoded LSF sets for interpolation with a subsequent frame, and wherein the processor retrieves quantized LPC filters and computes their weighted versions and to compute corresponding decimated spectrums, wherein a modulation is applied to the LPCs prior to computing the decimated spectrums based on pre-computed values, wherein the pre-computed values are retrieved from one or more look-up tables.

7. The decoder according to claim 6, wherein applying the root find algorithm involves finding polynomial F1(z) and/or F2(z) from the LSP representations by expanding respective product polynomials, and wherein scaling is performed as a power of 2 scaling of the polynomial coefficients.

8. The decoder according to claim 7, wherein the scaling involves a left bit-shift operation.

9. A method of decoding an encoded MPEG-D USAC bitstream, the encoded bitstream including a plurality of frames, each composed of one or more subframes, wherein the encoded bitstream includes, as a representation of linear prediction coefficients, LPCs, one or more line spectral frequency, LSF, sets for each subframe, wherein the method includes:

decoding the encoded bitstream, wherein decoding the encoded bitstream comprises:

decoding the LSF sets for each subframe from the bitstream; and converting the decoded LSF sets to linear spectral pair, LSP, representations, determining the LPCs based on the LSP representations by applying a root finding algorithm, and wherein applying the root finding algorithm involves scaling of coefficients of the LSP representations within the root finding algorithm to avoid overflow in a fixed point range, wherein the method further includes temporarily storing, for each frame, the decoded LSF sets for interpolation with a subsequent frame, and wherein the method further includes retrieving quantized LPC filters and computing their weighted versions and computing corresponding decimated spectrums, wherein a modulation is applied to the LPCs prior to computing the decimated spectrums based on pre-computed values, wherein the pre-computed values are retrieved from one or more look-up tables.

10. A decoder for decoding an encoded MPEG-D USAC bitstream, wherein the decoder is configured to implement a forward-aliasing cancellation, FAC, tool, for canceling time-domain aliasing and/or windowing when transitioning between Algebraic Code Excited Linear Prediction, ACELP, coded frames and transform coded, TC, frames within a linear prediction domain, LPD, codec, and wherein the decoder includes a processor for:

performing a transition from the LPD to the frequency domain, FD, and applying the FAC tool if a previous decoded windowed signal was coded with ACELP;

performing a transition from the FD to the LPD, and apply the FAC tool if a first decoded window was coded with ACELP, wherein the same FAC tool is used in both transitions from the LPD to the FD, and from the FD to the LPD, wherein using the same FAC tool corresponds to calling the same function in the code of a decoding application regardless of the current coding domain being LPD or FD, and wherein said function receives information relating to filter coefficients, zero input response, subframe length, FAC length, and/or the FAC signals as an input.

11. The decoder according to claim 10, wherein an ACELP zero input response is added, when the FAC tool is used for the transition from FD to LPD.

12. A method of decoding an encoded MPEG-D USAC bitstream by a decoder implementing a forward-aliasing cancellation, FAC, tool, for canceling time-domain aliasing and/or windowing when transitioning between Algebraic Code Excited Linear Prediction, ACELP, coded frames and transform coded, TC, frames within a linear prediction domain, LPD, codec, the method including:

performing a transition from the LPD to the frequency domain, FD, and applying the FAC tool if a previous decoded windowed signal was coded with ACELP;

performing a transition from the FD to the LPD, and applying the FAC tool if a first decoded window was coded with ACELP, wherein the same FAC tool is used in both transitions from the LPD to the FD, and from the FD to the LPD, wherein using the same FAC tool corresponds to calling the same function in the code of a decoding application regardless of the current coding domain being LPD or FD, and wherein said function receives information relating to filter coefficients, zero input response, subframe length, FAC length, and/or the FAC signals as an input.

13. A non-transitory, computer-readable medium with instructions adapted to cause a device having processing capability to carry out the method according to claim 12.

* * * * *